United States Patent
Dilz et al.

(10) Patent No.: US 6,249,215 B1
(45) Date of Patent: Jun. 19, 2001

(54) METHOD FOR SHUTTING DOWN A VEHICLE

(75) Inventors: Bernhardt Dilz, Sindelfingen; Dietbert Kollbach, Esslingen; Peter Robitschko, Sindelfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/099,102

(22) Filed: Jun. 18, 1998

(30) Foreign Application Priority Data

Jun. 18, 1997 (DE) .............................. 197 25 669

(51) Int. Cl.$^7$ .................................................. B60R 25/10
(52) U.S. Cl. ...................... 340/426; 340/425.5; 340/988; 340/989; 307/10.2; 180/287
(58) Field of Search ................................ 340/426, 425.5, 340/428, 429, 430, 989, 988, 990, 991, 992, 993; 307/10.2–10.6; 180/287

(56) References Cited

U.S. PATENT DOCUMENTS

| | | | |
|---|---|---|---|
| 3,786,422 | * | 1/1974 | Lubkin ................................ 340/989 |
| 3,893,108 | * | 7/1975 | McBride, Jr. et al. ............. 340/426 |
| 3,964,018 | * | 6/1976 | Strait et al. .......................... 340/426 |
| 4,136,329 | * | 1/1979 | Trobert ................................ 340/426 |
| 4,240,516 | * | 12/1980 | Henderson et al. ................ 180/289 |
| 4,292,620 | | 9/1981 | Pagane . |
| 4,412,204 | * | 10/1983 | Pagane ............................... 307/10.2 |
| 4,566,556 | * | 1/1986 | Wodeslavsky ...................... 180/287 |
| 5,081,667 | | 1/1992 | Drori et al. ............................ 379/59 |
| 5,276,728 | | 1/1994 | Pagliaroli et al. .................... 379/58 |
| 5,307,048 | * | 4/1994 | Sonders ............................... 340/426 |
| 5,394,135 | * | 2/1995 | Stadler ................................ 340/426 |
| 5,412,370 | * | 5/1995 | Berman et al. ..................... 340/426 |
| 5,451,925 | * | 9/1995 | Le ........................................ 340/426 |
| 5,494,130 | * | 2/1996 | Foster .................................. 180/287 |
| 5,532,690 | * | 7/1996 | Hertel ................................. 340/989 |
| 5,559,493 | * | 9/1996 | Karnwie-Tuah .................... 340/426 |
| 5,568,120 | * | 10/1996 | LeMense et al. ................... 340/426 |
| 5,838,227 | * | 11/1998 | Murray .............................. 340/425.5 |
| 5,848,373 | * | 12/1998 | DeLorme et al. .................. 701/200 |
| 5,912,615 | * | 6/1999 | Kretzmar et al. .................. 340/426 |
| 5,926,086 | * | 7/1999 | Escareno et al. .................. 340/426 |
| 5,929,753 | * | 7/1999 | Montague .......................... 340/426 |
| 5,937,823 | * | 8/1999 | Reeder et al. ..................... 123/335 |
| 5,939,975 | * | 8/1999 | Tsuria et al. ....................... 340/426 |

FOREIGN PATENT DOCUMENTS

| | | |
|---|---|---|
| 32 25 506 | 1/1984 | (DE) . |
| 37 08 997 | 10/1988 | (DE) . |
| 42 10 170 | 6/1993 | (DE) . |
| 92 10 788 | 8/1993 | (DE) . |
| 42 32 435 | 11/1993 | (DE) . |
| 295 08 903 U1 | 9/1995 | (DE) . |
| 195 08 369 | 3/1996 | (DE) . |
| 195 37 024 | 4/1996 | (DE) . |
| 44 43 298 | 6/1996 | (DE) . |
| 195 19 681 | 12/1996 | (DE) . |
| 195 38 694 | 4/1997 | (DE) . |
| 0 564 140 | 10/1993 | (EP) . |
| 2 305 285 | 4/1997 | (GB) . |

OTHER PUBLICATIONS

Technical Committee 278, Road Transport and Traffic Telematics (RTTT), European Committee for Standardization.

* cited by examiner

*Primary Examiner*—Nina Tong
(74) *Attorney, Agent, or Firm*—Evenson, McKeown, Edwards & Lenahan, P.L.L.C.

(57) ABSTRACT

A process and an arrangement for shutting down a vehicle by means of a shut-down signal is the result of a shut-down request. During a vehicle-side analysis, a conclusion is drawn from a current vehicle operating condition and/or a current vehicle location according to defined criteria regarding a shut-down site which is safe with respect to traffic and/or a traffic-safe shut-down site is recognized, in which case the shut-down signal is not generated before the current vehicle operating condition represents a traffic-safe shut-down site and/or before the current vehicle location corresponds to a traffic-safe shut-down site.

12 Claims, 2 Drawing Sheets

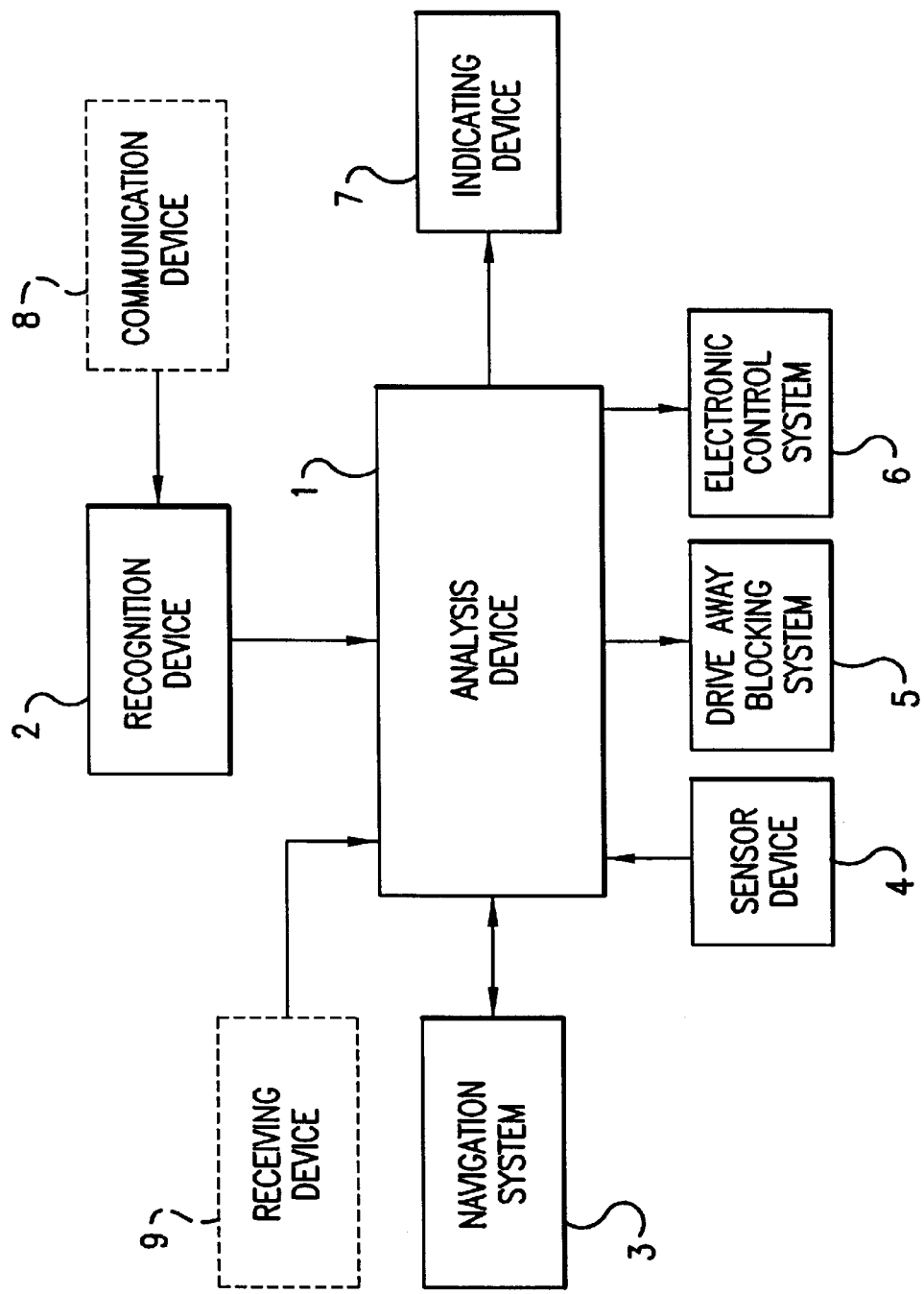

METHOD FOR SHUTTING DOWN A VEHICLE

BACKGROUND AND SUMMARY OF THE INVENTION

This application claims the priority of German patent 197 25 669.4-51, filed Jun. 18, 1997, the disclosure of which is expressly incorporated by reference herein.

The use of drive-away blocking devices has altered theft methods. Thus, organized bands of thieves have become specialized in transferring vehicles by means of transporters or in forcing the driver to hand over the key (car jacking). Locating and shut-down systems have therefore been offered for combatting vehicle theft and for a targeted intervening in the case of car jacking. These known shut-down systems can operate either immediately after the emission of the corresponding signal or not before the vehicle is stationary.

The invention relates to a method and an arrangement for shutting down a vehicle.

German Patent Document DE 32 25 506 A1 discloses a method for shutting down a vehicle, in which the vehicle is shut down by means of a shut-down signal which is emitted by a transmitter and is received by a vehicle-side receiver.

German Patent Document DE 195 08 369 C1 discloses a method for securing vehicles with respect to an unauthorized use, in which a vehicle is shut-down after a recognized unauthorized use. This occurs in that it is prevented that the vehicle is operated after it is next put out of operation or in that the vehicle operation is terminated by a progressive lowering of the driving performance until the vehicle is stopped.

From German Patent Document DE 195 19 681 A1, a method is known for shutting down a vehicle by means of a shut-down signal as the result of a shut-down request, in the case of which a vehicle-side analysis of a current vehicle operating condition draws a conclusion concerning a permissible shut-down location according to given criteria, in which case the shut-down signal is not generated before the current vehicle operating condition represents a permissible shut-down site.

From German Patent Document DE 195 38 694 A1, a method is known for shutting down a vehicle in which the current vehicle location is determined by means of a navigation system.

It may be considered to be a disadvantage of the above-mentioned documents that no measures are indicated for ensuring a shut-down of the vehicle under the aspect of traffic safety. Under unfavorable circumstances, for example, if the shut-down takes place in the middle of an intersection or on a railroad crossing, the shut-down of the vehicle may endanger innocent bystanders or traffic participants or the potential thief.

It is an object of the invention to provide a method for shutting down a vehicle which is safe with respect to the traffic and by which almost any danger to traffic is excluded.

According to the invention, this and other objects have been achieved by providing a method for shutting down a vehicle by means of a shut-down signal as the result of a shut-down request, during a vehicle-side analysis of a current vehicle operating condition according to defined criteria, a conclusion being drawn concerning a traffic-safe shut-down site, a first vehicle operating condition being recognized when the vehicle is refueled and/or when oil is refilled, a second vehicle operating condition being recognized when the vehicle is parked, a third vehicle operating condition being recognized when the vehicle is transported or towed, and the shut-down signal not being generated before the current operating condition represents a traffic-safe shut-down point.

According to the invention, this and other objects have been achieved by providing a method for shutting down a vehicle by means of a shut-down signal as the result of a shut-down request, characterized in that, during a vehicle-side analysis of a current vehicle location determined by a vehicle-side navigation system according to defined criteria, the current vehicle location is recognized as a traffic-safe shut-down site, the shut-down signal not being generated before the current vehicle location corresponds to a traffic-safe shut-down site.

According to the invention, this and other objects have been achieved by providing a method for shutting down a vehicle by means of a shut-down signal as the result of a shut-down request, characterized in that, during a vehicle-side analysis of a current vehicle location determined by a vehicle-side navigation system according to defined criteria, the current vehicle location is recognized as a not traffic-safe shut-down site, the generating of the shut-down signal being prevented if the current vehicle location corresponds to a not traffic-safe shut-down site.

According to the invention, this and other objects have been achieved by providing an arrangement for shutting down a vehicle by means of a shut-down signal at a shut-down site after a shut-down request was made, characterized in that, on the vehicle side, a recognition device for determining an unauthorized use, an analysis device and a sensor device with several sensors are provided, the recognition device activating the analysis device by means of the shut-down request, the analysis device analyzing data of the sensor device as to whether the current vehicle operating condition represents a traffic-safe shut-down site which is characterized by whether the vehicle is being fueled and/or oil is being refilled, whether the vehicle is parked, or whether the vehicle is transported or towed, and the analyzing device 1 not generating the shut-down signal for activating a drive-away blocking system before the current vehicle operating condition represents a traffic-safe shut-down site.

According to the invention, this and other objects have been achieved by providing an arrangement for shutting down a vehicle by means of a shut-down signal at a shut-down site after a shut-down request was made, characterized in that, on the vehicle side, a recognition device for determining an unauthorized use, an analysis device and a navigation system are provided, the recognition device activating the analysis device by means of the shut-down request, the analysis device analyzing a current vehicle location determined by the navigation system as to whether the current vehicle location corresponds to a traffic-safe shut-down site or a shut-down site which is not safe with respect to traffic, and the analyzing device generating the shut-down signal for activating a drive-away blocking system only when the current vehicle location coincides with a traffic-safe shut-down site.

The main idea of the invention is based on the fact that the shutting-down of the vehicle which is safe with respect to the traffic is carried out in two phases. In a first phase, an unauthorized use of the vehicle is recognized and a shut-down request is generated. However, the recognition of an unauthorized use is not the object of this invention. From the state of the art, different methods are known for the secure recognition of an unauthorized use of a vehicle. Thus, an unauthorized use can be reported to the vehicle by an external center by means of a shut-down request which is received by a vehicle-side communication device. In this case, it may also be considered to be an unauthorized use if a rightful user is to be prevented from further using the vehicle, for example, in the event of a police search, in the case of a hit-and-run driver, or in the case of delinquent leasing or financing payments, automobile taxes or automobile insurance premiums. However, an unauthorized use can also be determined by a detection device in the vehicle; for example, if, as described in German Patent Document DE 195 08 369 C1, given use limitations, such as a maximally drivable route, a limited use duration or a fixed geographical area, which must not be left, are exceeded. If an exceeding of one of the given use limitations is recognized, a shut-down request is also generated.

In a second phase, a vehicle-side analysis is activated by the shut-down request. During the vehicle-side analysis, a current vehicle operating condition is analyzed according to given criteria by means of which a conclusion can be drawn on a shut-down site which is safe with respect to traffic. A shut-down signal will not be generated before the current vehicle operating condition represents a safe shut-down site with respect to traffic.

Traffic-safe shut-down sites are all current locations of the vehicle at which a shut-down of the vehicle can be carried out without endangering the vehicle occupants and/or other traffic participants, for example, when the vehicle is located at a gas station, in a parking area, on the shoulder of a road, at a border control point or at similar locations. As criteria for recognizing such traffic-safe shut-down sites, data of sensors, which are arranged on the vehicle side, are analyzed which represent the vehicle operating condition. If it is recognized during the vehicle-side analysis that the vehicle is being refueled or that the vehicle is parked or that the vehicle is being transported or towed, the conclusion can be drawn from these vehicle operating conditions that the current site of the vehicle corresponds to a shut-down site which is safe with respect to traffic, and the shut-down signal can be generated.

In the second phase, instead of or in addition to the current vehicle operating condition, a current vehicle location determined by means of a vehicle-side navigation system can be analyzed according to given criteria, in which case the navigation system uses, for example, a GPS (Global Positioning System) for determining the current vehicle location. The traffic-safe shut-down sites can then be stored ahead of time, for example, by means of their coordinates and, during the analysis, can be compared with the current vehicle location. A memory unit will then contain, for example, a list of possible traffic-safe shut-down sites (gas stations, parking garages, parking lots, border crossing checkpoints, etc.). In addition to the analysis as to whether the current vehicle location corresponds to one of the previously stored traffic-safe shut-down sites, by means of the navigation system, the current vehicle location can be analyzed by a comparison with road maps stored in the navigation system as to whether the current location of the vehicle is next to the road, for example, on a shoulder, in a garage or at a similar traffic-safe shut-down site. Only when the current vehicle location coincides with one of the possible traffic-safe shut-down locations and when, by means of a vehicle-side analysis of the vehicle operating condition, it is ensured that the vehicle is no longer moving or that the vehicle is transported or towed, will the shut-down signal be generated. For determining that the vehicle is being transported or towed, in addition to the vehicle operating condition, the current vehicle location determined by the navigation system can also be analyzed. If the analysis of the vehicle operating condition shows that the engine is not operative and if the analysis of the current vehicle location shows that the vehicle is moving because the current vehicle location has changed between two locating operations, it can be concluded that the vehicle is being transported or towed.

In addition, it is contemplated to analyze the current vehicle location determined by means of the vehicle-side to navigation as to whether exclusion criteria are present; that is, whether the current vehicle location coincides with a not traffic-safe shut-down site at which a shut-down of the vehicle should be prevented, for example, when the vehicle is located in an intersection or on a train crossing. Since, during the determination of the current location, the navigation system has a certain tolerance, the shut-down of the vehicle should already be prevented when the current vehicle location is in the proximity of an intersection or of a railroad crossing.

By the additional use of the navigation system for the analysis as to whether the current vehicle location corresponds to a traffic-safe shut-down site, traffic safety can be increased significantly when a vehicle is shut down, particularly if, in addition to the analysis as to whether the current vehicle operating condition represents a traffic-safe shut-down site, the current vehicle location is analyzed, in which case it is recognized whether the current vehicle location corresponds to a shut-down site which is not safe with respect to traffic or to a traffic-safe shut-down site.

By means of the process according to the invention, dangerous traffic situations are advantageously avoided, as may occur, for example, if, after the recognition of an unauthorized use, it is only prevented that the vehicle is operated again after it is next put out of operation. If, after it is next put out of operation, which may take place, for example, accidentally because of an erroneous operation by the unauthorized user, the vehicle is located at a site which is not safe with respect to traffic, for example, on a railroad crossing or in an intersection, this may result in a dangerous traffic situation because the vehicle can no longer be removed from the not traffic-safe shut-down site without outside help.

In the case of a particularly advantageous embodiment of the process according to the invention, for analyzing the current vehicle operating condition, data are used of sensor devices which are already used in the vehicle for different purposes. For recognizing a first vehicle operating condition "vehicle is refueled", the data of a filling level sensor, which represent the filling level in the fuel tank, are analyzed. If the analysis of these data indicates a clear increase of the filling level in the fuel tank, for example, if the filling level increases by 5 liters or by 5% with respect to the filling level before the increase, the first vehicle operating condition is recognized and it is concluded that the current vehicle location corresponds to a traffic-safe shut-down site, for example, a gas station, a road shoulder or a parking lot, and the shut-down signal is generated. The same approach can be used analogously with respect to the oil level. A special advantage of this embodiment of the invention is the fact that filling level sensors already existing in the vehicle can be used for the analysis. Another possibility for determining the first vehicle operating condition consists of providing a flow-through sensor at the tank filler neck by means of which it can be determined whether a flow through the tank filler neck is taking place or not. In addition, such a flow-through sensor can also be provided at the oil filler neck. Furthermore, it is conceivable to analyze by means of a gas sensor whether the proportion of gasoline fumes in the ambient air of the current vehicle location exceeds a certain limit value, from which it can be concluded that the vehicle is at a gas station.

For recognizing a second vehicle operating condition "vehicle is parked", a combination of several vehicle-side sensor data is analyzed (engine off and/or central locking system or anti-theft device locked or activated and/or parking brake engaged and/or automatic transmission in P-position and/or seat-occupied recognition, etc.) by means of which it can be recognized whether the second vehicle operating condition exists or not. If, during the analysis of the current vehicle operating condition, the second vehicle operating condition is recognized, it can be concluded that the current vehicle location corresponds to a traffic-safe shut-down site, for example, a parking lot, a parking garage, an edge of a road or a shoulder of a road, and the shut-down signal is generated.

For recognizing a third vehicle operating condition "vehicle is transported", a combination of several vehicle-side sensor data is analyzed (engine off and/or vehicle is being moved, etc.) by means of which it can be determined whether the third vehicle operating condition exists or not. If, during the analysis of the current vehicle operating condition, the third vehicle operating condition is recognized, it can be concluded that the vehicle can be shut down without endangering traffic; that is, a transport or a towing of the vehicle is considered to be a traffic-safe shut-down site, and the shut-down signal is generated.

In addition to the described measures, during the analysis, external transmission signals with a shut-down code can also be taken into account which are emitted, for example, by means of induction loops at traffic-safe shut-down sites, such as gas stations, border check points or payment points, in which case these transmission signals are not addressed to specific vehicles. The shut-down code affects only those vehicles in the case of which an unauthorized use was recognized and in the case of which a shut-down request exists. The transmission signals have no effect on vehicles for which no shut-down request exists.

In addition, measures may be provided which cause an alleged vehicle thief to drive to a shut-down site which is safe with respect to traffic. Thus, indicating devices for vehicle operating conditions, which are part of a combination instrument, can be manipulated if an unauthorized use was recognized and a shut-down request exists. The manipulation can, for example, be carried out on a fuel filling level indicator in that, irrespective of the fuel filling level, the fuel filling level indicator is controlled as if the filling level of the fuel tank were in the reserve range. In addition, a possibly existing reserve warning device can also be activated. Analogously, it is contemplated to manipulate an oil level indicator. By this measure, an alleged vehicle thief is caused to refuel the vehicle or refill it with oil in that he brings the vehicle to a traffic-safe shut-down site, for example, to a gas station, for the shutting-down. Such a traffic-safe shut-down site is then recognized by means of the described vehicle-side analysis and the shut-down signal is generated.

In the case of another advantageous further development, if during the vehicle-side analysis no traffic-safe shut-down site was recognized or a shut-down site was recognized which is not safe with respect to traffic, measures can be provided which influence the engine power of the vehicle. Thus, after a shut-down request, the engine power can be reduced step-by-step or continuously down to an emergency operation by an intervention in the electronic system of the engine. In connection with the above-described measure of manipulating the indicating devices of the vehicle, this can additionally cause the alleged thief to drive to a traffic-safe shut-down site, such as a repair shop or a gas station. By means of the vehicle-side analysis, this traffic-safe shut-down site will be recognized and the shut-down signal will be generated. The reduction of the available engine power takes place, for example, step-by-step during each stoppage of the vehicle which is recognized by the analysis of the current vehicle operating condition at a shut-down point which the vehicle-side analysis does not recognize as being traffic-safe, as, for example, at a red traffic light or at similar locations, or continuously during the drive while taking into account additional criteria, in which case it must particularly be taken into account that no passing maneuver exists, in that, for example, by the analysis of the current vehicle operating condition, it is checked whether the vehicle is just accelerating.

The reduction of the available engine power during the drive is particularly useful in the case of vehicles which must be operated only within a defined geographical area and which are to be shut down outside the defined geographical area. For this purpose, in the event of a crossing of the defined area border, the available engine power is reduced continuously down to an emergency operation. After the emergency operation has been reached and when a traffic-safe shut-down site is recognized during the vehicle-side analysis, the shut-down signal is generated. This ensures that the vehicle can be used only to a defined tolerance limit outside the given geographical area. If a user of the vehicle erroneously crosses the defined border of the area, he can turn around and drive back into the defined geographical area. When the border of the area is approached, the available engine power will then again be increased continuously until, at the border, the maximally achievable engine power will again be available. For informing the driver, a corresponding message can be emitted visually or acoustically, for example, as a voice output which informs him correspondingly of the start of the engine power reduction or of the engine power increase. In addition, in certain areas in which a turning-around is not possible, for example, on turnpikes, the tolerance range in which the engine power is reduced can be enlarged so that a driver who erroneously leaves the defined geographical area can reach the nearest turn-around possibility, for example, an exit.

Other objects, advantages and novel features of the present invention will become apparent from the following detailed description of the invention when considered in conjunction with the accompanying drawings.

BRIEF DESCRIPTION OF THE DRAWINGS

FIG. 2 is a block diagram of a preferred embodiment of an arrangement for implementing the process according to the invention.

DETAILED DESCRIPTION OF THE DRAWINGS

Figure 1:
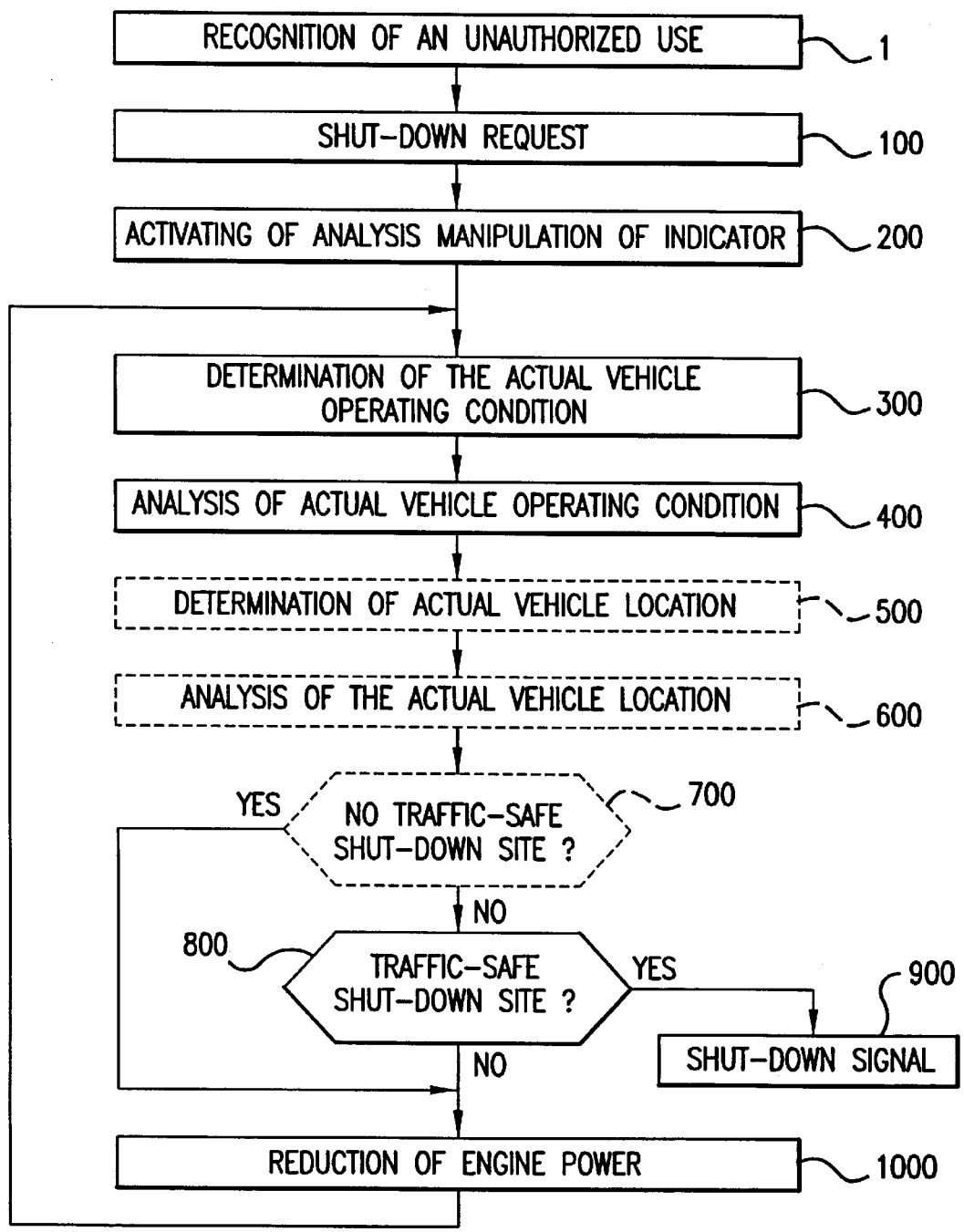
FIG. 1 is a flow chart of a preferred embodiment of a method for shutting down a vehicle according to the present invention.

As illustrated in FIG. 1, after the recognition of an unauthorized vehicle use in process step 1, which is not the object of this invention, a shut-down request is generated in process step 100 which, in process step 200 activates a vehicle-side analysis. In addition, in process step 200, an indicating device, which comprises, for example, an indicator for showing the fuel filling level and/or the oil filling level or the oil pressure, is manipulated such that an unauthorized user of the vehicle is caused to refuel the vehicle or to refill the vehicle with oil. In step 300, the current vehicle operating condition is determined from data of vehicle-side sensor devices. In step 400, the current vehicle operating condition is analyzed according to given criteria from which a conclusion can be drawn with respect to a traffic-safe shut-down site. Thus, it is checked, for example, whether or not the current vehicle operating condition corresponds to one of the vehicle operating conditions "vehicle is being refueled", "vehicle is parked", or "vehicle is transported".

In process step 500, the current vehicle location is determined from data of a navigation system which for this purpose comprises a GPS (Global Positioning System) or another locating system. In process step 600, the current vehicle location is analyzed according to given criteria. Thus, it is checked, for example, whether the current vehicle location coincides with a given traffic-safe shut-down site, or whether the vehicle is located on the side of the road, for example, on a shoulder of the road or at a similar location, in which case, for the checking, the current vehicle location can be compared with road maps existing in the navigation system. In addition, it is analyzed in process step 600 whether the current vehicle location coincides with a shut-down site which is not safe with respect to traffic, in which case it is checked by a comparison of the current vehicle location with road maps existing in the navigation system whether the current vehicle location corresponds to a shut-down site which is not safe with respect to traffic, such as an intersection or a railroad crossing. By means of inquiry 700, it is determined whether a shut-down site was recognized which is not safe with respect to traffic. If the answer to inquiry 700 is "yes", a branching to process step 1000 takes place. If the answer to inquiry 700 is "no", a branching to inquiry 800 takes place. By means of inquiry 800, it is checked whether or not a traffic-safe shut-down site was recognized. If the answer to inquiry 800 is "no", a branching to step 1000 takes place. If the answer to inquiry 800 is "yes", in process step 900 a shut-down signal is generated for activating a drive-away blocking system and the process is terminated, in which case the thus activated drive-away blocking system can be deactivated only by an authorized party. In step 1000, a process is activated for reducing the engine power and then a branching to step 300 takes place.

Process steps 500 to 700 are indicated by broken lines because a vehicle-side navigation system is necessary for their implementation. However, for implementing an embodiment of the process according to the invention, a vehicle-side navigation system is not required. But the presence of a navigation system increases the recognition reliability of a traffic-safe shut-down site because a traffic-safe shut-down site which was recognized by the analysis of the current vehicle operating condition can be checked again. Furthermore, by the additional analysis of the current vehicle location, the recognition of the third vehicle operating condition "vehicle is transported" will can be improved in that, in addition to the analysis of the data of a sensor device, two locating operations are carried out successively. If the analysis of the locating operations reveals that the current vehicle location is changing, and the analysis of the data of the sensor device indicates that the engine is not operating, the third vehicle operating condition is recognized.

Furthermore, by means of the vehicle-side locating and/or navigation system, additional safe shut-down sites can be recognized, such as border check points, payment points, etc., which cannot be recognized by the analysis of the current vehicle operating condition. Therefore, in principle, all possible traffic-safe shut-down points, which do not correspond to a traffic route, can be recognized within the range of tolerance of the used navigation system.

For recognizing the first vehicle operating condition "vehicle is being refueled" in process step 400, the data of a fuel filling level sensor, which already exists in the vehicle, are advantageously analyzed. If the analysis indicates that the filling level of the fuel tank is increasing by a certain percentage, for example, by 5%, relative to the filling level before the increase, or by a certain absolute value, for example, 5 liters, the determination is made that the vehicle is being refueled.

For recognizing the second vehicle operating condition "vehicle is parked" in process step 400, the data of sensor devices which already exist in the vehicle are advantageously analyzed. Thus, for determining whether or not the engine is operating, the data of a corresponding engine sensor are analyzed; in addition, by analyzing the data of rotational wheel speed sensors, it is analyzed whether or not the vehicle is moving. In addition, the data of other sensors, for example, of seat sensors for recognizing whether or not a vehicle seat is occupied; of door contacts for recognizing whether a door was opened and closed again; of an ignition lock sensor for recognizing whether or not a key is in the ignition lock, of locking sensors for recognizing whether or not a vehicle is locked; of a parking brake sensor for recognizing whether or not the parking brake is engaged; of a selector lever sensor for recognizing whether or not an automatic transmission is in the P-position can be analyzed for determining that the vehicle is parked and the shut-down site is therefore safe with respect to traffic. In process step 400, a logic AND operation preferably takes place of the signals of the engine sensor (engine is off), of the rotational wheel speed sensors (wheels are not rotating), of the ignition lock sensor (key is not in lock) and of the locking sensors (vehicle is locked). If all conditions are true, the second vehicle operating condition "vehicle is parked" is recognized. Naturally other logic combinations can also be formed of the above-mentioned sensor signals, as long as it is ensured that the second operating condition is recognized by the combination. In addition, after the switching-off of the engine or after the withdrawing of the ignition key from the ignition lock, a time window, which is between approximately 5 and 10 minutes, can be started for recognizing the vehicle operating condition "vehicle is parked". If, within the time window, no change of the vehicle operating condition, for example, an attempt to start the engine or similar event, is recognized by analyzing the data of the sensor devices, after the expiration of this time window, the vehicle operating condition "vehicle is parked" will be recognized. For recognizing the third vehicle operating condition "vehicle is transported" in process step 400, the data of sensor devices already existing in the vehicle are also advantageously analyzed. Thus, for determining whether or not the engine is operating, the data of the corresponding engine sensor are analyzed; in addition, by analyzing the data of the rotational wheel speed sensors, it is analyzed whether or not the vehicle is moving. In addition, the data of gradient sensors and/or rate-of-rotation sensors are analyzed. By analyzing the data of gradient sensors and/or rate-of-rotation sensors, it can be recognized whether the position of the vehicle was changed. This normally occurs during the loading onto a transporter or during towing.

As illustrated in FIG. 2, an embodiment of an arrangement for carrying out the process according to the invention comprises an analysis device 1, in which case the analysis device 1 is connected with a recognition device 2 for recognizing an unauthorized use, in which case, after a recognized unauthorized use, the recognition device 2 generates a shut-down request whereby the analysis of the analysis device 1 is activated. Furthermore, the analysis device 1 is connected with a navigation system 3, which comprises a locating system for determining the current vehicle location, and with a sensor device 4 which comprises all necessary sensors for determining the vehicle operating condition. In addition, the analysis device 1 is connected with a drive-away blocking system 5 for shutting down the vehicle, an electronic control system 6 for controlling the engine which, as required, can be influenced by the analysis device 1 for reducing the available engine power, and with an indicating device 7 for indicating operation-relevant parameters, which, as required, can be manipulated by the analysis device 1. In addition, the devices can be provided which are illustrated by broken lines, such as a communication device 8 which is designed to receive a shut-down request from an external center, the shut-down request being transmitted by way of a pager system, the GSM-network or by means of satellite communication to the communication device 8, and/or a receiving device 9, in which case the receiving device 9 is designed to receive an external transmission signal which is emitted, for example, by an induction loop and which represents a traffic-safe shut-down site. The connections between the individual components for the traffic-safe shut-down of a vehicle are preferably constructed as an optical or electronic data bus system.

The core of the arrangement for implementing the process according to the invention is the analysis device 1 which can be constructed, for example, as a microprocessor with the pertaining memory devices. The analysis device 1 may be a general purpose processor programmed with instructions that cause the processor to perform the described steps, specific hardware components that contain hard-wired logic for performing the described steps, or any combination of programmed general purpose computer components and custom hardware components. After a shut-down request has been made by the recognition device 2, the analysis device 1 manipulates the fuel filling level indicator, which is part of the indicating device 7, such that the unauthorized user is informed that the filling level in the fuel tank has reached the reserve range. In addition, the oil level indicator can be manipulated such that the unauthorized user will have the impression that the oil level is too low and oil must be refilled. Subsequently, the current vehicle operating condition is determined and analyzed from the data of the sensor device 4. Then the current vehicle location is determined and analyzed by means of the navigation system. If the analysis device 1 recognizes that the current vehicle location coincides with a traffic-safe shut-down site, the analysis device 1 will generate the shut-down signal for activating the drive-away blocking system 5. If the analysis device 1 recognizes no traffic-safe shut-down site or if a shut-down site is recognized which is not safe with respect to traffic, the analysis device 1 will influence the electronic control system 6 of the engine with respect to reducing the engine power. In addition, it is contemplated to activate the analysis device 1 not only after a shut-down request but that the determination of the current vehicle operating condition and of the current vehicle location is carried out continuously and the results are stored in corresponding memory devices which may be a part of the analysis device 1 so that, after a shut-down request, the analysis device 1 can immediately start to analyze.

If the vehicle has a system for limiting the use, particularly a system for a geographical use limitation, that is, the vehicle must only be operated within a defined geographical area, the analysis device 1 will carry out a special type of shut-down. When the vehicle crosses a defined area border, within a defined additional tolerance area, the available engine power is continuously reduced down to an emergency operation by an intervention in the electronic control system 6 of the engine, and subsequently, when a traffic-safe shut-down site is recognized, the vehicle is shut down, as described above. If, within the defined additional tolerance area and therefore still before the shut-down, the vehicle again approaches the defined area border, the available engine power is continuously increased again up to a maximal value by an intervention into the electronic control system 6 of the engine, in which case the maximal value is reached when driving into the defined geographical area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for shutting down a vehicle, comprising:

sensing a shut-down request, determining whether the vehicle is in a traffic-safe shut-down site by analyzing a current vehicle operational status after said shut-down request is sensed, based on signals from sensors for vehicle operational parameters, said traffic-safe shut-down site corresponding to at least one of the following traffic-safe shut-down vehicle operational statuses:

(a) in a first vehicle operational status, the vehicle is being refilled with at least one of fuel and oil, (b) in a second vehicle operational status, the vehicle is parked, and (c) in a third vehicle operational status, the vehicle is being transported or towed, and generating a shut-down signal after the current operational status corresponds to at least one of said traffic-safe shut-down vehicle operational statuses.

2. The method for shutting down a vehicle according to claim 1, wherein the first vehicle operational status is recognized by analyzing data from at least one of a fuel filling level sensor and an oil filling level sensor.

3. The method for shutting down a vehicle according to claim 1, wherein the first vehicle operational status is recognized by analyzing data from a flow-through sensor.

4. The method according to claim 1, wherein:

said step of determining whether the vehicle is in a traffic-safe shut-down site further comprises the step of determining a current vehicle location via a vehicle-side navigation system after said shut-down request is sensed; and said generating step further comprises generating a shut-down signal after the current vehicle location corresponds to said traffic-safe shut-down site.

5. A method for shutting down a vehicle, sensing a shut-down request;

recognizing whether the vehicle is in a traffic-safe shut-down site by determining a current vehicle location via a vehicle-side navigation system after said shut-down request is sensed; and generating a shut-down signal after the current vehicle location corresponds to said traffic-safe shut-down site; wherein said recognizing comprises step analyzing transmission signals generated outside the vehicle which are received by a vehicle-side device; and the transmission signals are transmitted by induction loops to the vehicle, the induction loops being arranged at traffic-stop shut-down sites.

6. A method for shutting down a vehicle comprising:

sensing a shut-down request;

recognizing whether the vehicle is in a non-traffic-safe shut-down site by determining a current vehicle location via a vehicle-side navigation system after said shut-down request is sensed; and preventing generation of a shut-down signal if the current vehicle location corresponds to said non-traffic-safe shut-down site;

wherein a first of said non-traffic-safe shut-down sites is recognized when the vehicle is located in an intersection, and wherein a second of said non-traffic-safe shut-down sites is recognized when the vehicle is located on a railroad crossing.

7. A method for shutting down a vehicle comprising:

sensing a shut-down request;

recognizing whether the vehicle is in a traffic-safe shut-down site by determining a current vehicle location via a vehicle-side navigation system after said shut-down request is sensed; and generating a shut-down signal after the current vehicle location corresponds to said traffic-safe shut-down site; and when no traffic-safe shut-down site is recognized during the recognizing step, progressively reducing an available engine power continuously or in defined steps via the electronic control system of the engine.

8. A method for shutting down a vehicle comprising:

sensing a shut-down request;

recognizing whether the vehicle is in a traffic-safe shut-down site by determining a current vehicle location via a vehicle-side navigation system after said shut-down request is sensed; and generating a shut-down signal after the current vehicle location corresponds to said traffic-safe shut-down site;

recognizing a geographical use limitation of the vehicle to a pre-defined area; and when the navigation system senses that the vehicle is outside of said pre-defined area, reducing the available engine power continuously or in defined steps when the navigation system senses that the vehicle is moving away from said pre-defined area, and increasing the available engine power continuously or in defined steps when the navigation system senses that the vehicle is moving toward said pre-defined area.

9. A system for shutting down a vehicle due to unauthorized use, comprising:

a recognition device which recognizes an unauthorized use of the vehicle and causes a shut-down request to be generated;

a sensor device with several sensors which sense vehicle operating conditions; and an analysis device which is activated by the shut-down request, the analysis device analyzing vehicle operating condition data from the sensor device to determine whether the vehicle is located in a traffic-safe shut-down site corresponding to at least one of the following traffic-safe shut-down vehicle operational statuses:

(a) the vehicle is being is being refilled with at least one of fuel and oil, (b) the vehicle is parked, and (c) the vehicle is being transported or towed, and the analysis device generating a shut-down signal after the current vehicle operating condition corresponds to at least one of said traffic-safe shut-down vehicle operational statuses.

10. The system according to claim 9, wherein an indicating device is provided on the vehicle which is manipulated by the analysis device as the result of the shut-down request.

11. The system according to claim 9 wherein when the analysis device recognizes no traffic-safe shut-down site, the analysis device reduces power of the engine continuously or in steps by way of an engine electronic control system.

12. A system for shutting down a vehicle due to unauthorized use, comprising:

a recognition device which recognizes an unauthorized use of the vehicle and causes a shut-down request to be generated;

a navigation system; and an analysis device which is activated by the shut-down request, the analysis device analyzing a current vehicle location determined by the navigation system to determine whether the current vehicle location corresponds to a traffic-safe shut-down site or a shut-down site which is not traffic-safe, and the analyzing device generating a shut-down signal when the current vehicle location corresponds to a traffic-safe shut-down site;

wherein when the analysis device recognizes no traffic-safe shut-down site, the analysis device reduces the power of the engines continuously or in increments, by way of an engine electronic control system.

* * * * *